(12) United States Patent
Han et al.

(10) Patent No.: US 10,476,057 B2
(45) Date of Patent: Nov. 12, 2019

(54) EASY-TO-REMOVE MEMBER, BATTERY ASSEMBLY AND ELECTRONIC DEVICE

(71) Applicant: BEIJING XIAOMI MOBILE SOFTWARE CO., LTD., Beijing (CN)

(72) Inventors: Lingli Han, Beijing (CN); Jinhu Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/266,060

(22) Filed: Feb. 2, 2019

(65) Prior Publication Data

US 2019/0252653 A1    Aug. 15, 2019

(30) Foreign Application Priority Data

Feb. 12, 2018   (CN) .......................... 2018 1 0146638

(51) Int. Cl.
*H01M 2/10*    (2006.01)
*G06F 1/16*    (2006.01)

(52) U.S. Cl.
CPC ........ *H01M 2/1066* (2013.01); *G06F 1/1635* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,023,511 B1 * | 5/2015 | Chamberlain | ...... | H01M 2/1066 429/163 |
| 9,498,907 B2 * | 11/2016 | Yoo | ..................... | H04M 1/0249 |
| 9,537,122 B2 * | 1/2017 | Lin | ..................... | H01M 2/1022 |
| 9,680,187 B2 * | 6/2017 | Stephens | ............. | H01M 10/425 |
| 10,084,165 B2 * | 9/2018 | Fukushima | .......... | H04N 5/2252 |
| 2011/0274997 A1 * | 11/2011 | Langan | ............... | H01M 2/1022 429/445 |
| 2014/0113505 A1 | 4/2014 | Lin et al. | | |

(Continued)

FOREIGN PATENT DOCUMENTS

| | | |
|---|---|---|
| CN | 205790099 U | 12/2016 |
| CN | 107507936 A | 12/2017 |
| WO | 2017127293 A1 | 7/2017 |

OTHER PUBLICATIONS

European Patent Office, Extended European Search Report Issued in Application No. 19156607.4, dated Apr. 30, 2019, Germany, 9 pages.

*Primary Examiner* — Lisa Lea-Edmonds
(74) *Attorney, Agent, or Firm* — Syncoda LLC; Feng Ma (57) ABSTRACT

An easy-to-remove member includes a first surface and a second surface. The first surface includes a weak adhesive portion that is bonded with a bottom surface of a battery, and a strong adhesive portion that is bonded with a top surface of the battery. A separating structure is arranged at a boundary between the weak adhesive portion and the strong adhesive portion and is to separate the easy-to-remove member into a first body and a second body. The first body corresponds to the weak adhesive portion. The second body corresponds to the strong adhesive portion. At least a part of the second surface of the first body is bonded with an inner wall of a battery cabin and the second surface of the second body is attached to the inner wall of the battery cabin.

20 Claims, 4 Drawing Sheets

(56) References Cited

U.S. PATENT DOCUMENTS

| | | | |
|---|---|---|---|
| 2014/0146448 A1* | 5/2014 | Yoo | B29C 45/14811 |
| | | | 361/679.01 |
| 2014/0177141 A1* | 6/2014 | Cao | G06F 1/1635 |
| | | | 361/679.01 |
| 2014/0355207 A1 | 12/2014 | Stephens et al. | |
| 2014/0377595 A1* | 12/2014 | Baba | G08B 6/00 |
| | | | 429/8 |
| 2015/0228944 A1* | 8/2015 | Lin | H01M 2/1066 |
| | | | 429/100 |
| 2016/0093846 A1* | 3/2016 | Malinski | H01M 2/1066 |
| | | | 429/100 |
| 2017/0033335 A1* | 2/2017 | Kojima | H01M 2/0267 |
| 2018/0159097 A1* | 6/2018 | Fukushima | H04N 5/2252 |
| 2019/0016061 A1* | 1/2019 | Zeng | H01M 2/1066 |

* cited by examiner

EASY-TO-REMOVE MEMBER, BATTERY ASSEMBLY AND ELECTRONIC DEVICE

CROSS-REFERENCE TO RELATED APPLICATIONS

This application claims priority to Chinese Patent Application No. 201810146638.4 filed on Feb. 12, 2018, the entire content of which is incorporated herein by reference.

BACKGROUND

An electronic device includes a device body and a battery assembly arranged inside the device body. The battery assembly supplies electric energy to the electronic device for running. The battery assembly is mounted in the device body in a way that the battery assembly and the device body are mounted together in a fixing manner. During production and after-sales repair of a consumable electronic product such as a mobile phone, disassembling the battery assembly of the electronic product may be required.

SUMMARY

The present disclosure relates to an easy-to-remove member, a battery assembly and an electronic device.

In a first aspect, an easy-to-remove member is provided. The easy-to-remove member may be applied to an electronic device including a device body and a battery. The device body is provided with a battery cabin for receiving the battery. The battery includes a bottom surface and a top surface arranged oppositely and a side surface connecting the top surface and the bottom surface.

The easy-to-remove member includes a first surface and a second surface; the first surface includes a weak adhesive portion and a strong adhesive portion. The weak adhesive portion is to be bonded with the bottom surface of the battery. The strong adhesive portion is to be bonded with the top surface of the battery. A separating structure is arranged at a boundary between the weak adhesive portion and the strong adhesive portion, the separating structure is to separate the easy-to-remove member into a first body and a second body. The first body corresponds to the weak adhesive portion and the second body corresponds to the strong adhesive portion. At least a part of the second surface of the first body is to be bonded with an inner wall of the battery cabin and the second surface of the second body is to be attached to the inner wall of the battery cabin.

In a second aspect of the present disclosure, a battery assembly comprising a battery and the above easy-to-remove member is provided.

In a third aspect of the present disclosure, an electronic device is provided. Where, the electronic device includes a processor, a memory, a device body and the above battery assembly. The memory stores instructions executable by the processor; the device body is provided with a battery cabin. The battery assembly is received in the battery cabin of the device body.

According to some embodiments of the present disclosure, the battery is wrapped with the easy-to-remove member and thus attached to the battery cabin, thereby facilitating installation. The first surface of the easy-to-remove member is divided into the strong adhesive portion and the weak adhesive portion and the separating structure may be arranged at the boundary between the strong adhesive portion and the weak adhesive portion. The easy-to-remove member is located between the battery cabin and the battery in a way that only the first body corresponding to the weak adhesive portion of the easy-to-remove member is bonded with the battery cabin. When disassembling the battery from the device body of the electronic device, the second body attached to the battery is separated from the first body and thus the battery is also separated from the first body, so that the first body remains in the battery cabin as well as the battery and the second body are separated from the battery cabin. Due to low bonding strength between the battery and the weak adhesive portion, a force required for separating the battery from the first body is relatively low and a deformation caused to the battery is relatively small, thereby supporting repeated disassembly.

It should be understood that the general descriptions above and detailed descriptions below are illustrative and explanatory only and are not intended to limit the present disclosure.

In the drawings,
10 indicates a strong adhesive portion,
11 indicates an avoiding notch,
12 indicates a second adhesive-free portion,
13 indicates a cross beam portion,
14 indicates a leg portion,
20 indicates a weak adhesive portion,
21 indicates a main body,
22 indicates a handle,
221 indicates a strong adhesive zone,
222 indicates a first adhesive-free portion,
23 indicates a first body,
24 indicates a second body,
30 indicates an easy-to-tear fold,
31 indicates a dotted line portion,
32 indicates a cutting seam,
33 indicates separating groove,
40 indicates a battery,
41 indicates a bottom surface,
42 indicates a top surface,
43 indicates a side surface,
50 indicates a device body,
51 indicates a battery cabin,
60 indicates an electronic device,
61 indicates a processing assembly,
62 indicates a memory,
63 indicates a power source assembly,
64 indicates a multimedia assembly, 65 indicates an audio assembly,
66 indicates an Input/output (I/O) interface,
67 indicates a sensor assembly,
68 indicates a communication assembly, and
69 indicates a processor.

DETAILED DESCRIPTION

The inventors of the present disclosure have recognized that, a battery is often bonded with a device body by using an easy-to-pull adhesive. However, the material of the easy-to-pull adhesive is soft and may be subjected to a chemical change when environmental factors such as temperature and humidity change. The easy-to-pull adhesive may be easily torn during a process of removing the battery from the device body with the easy-to-pull adhesive.

Figure 1:
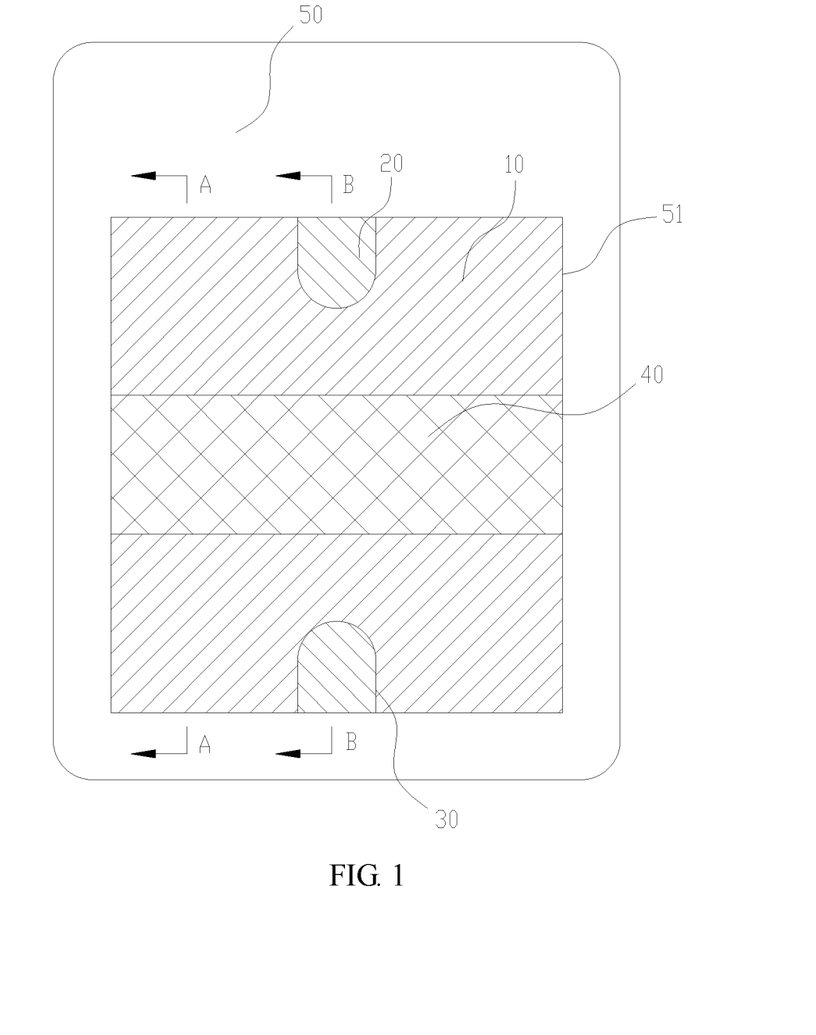
FIG. 1 is a schematic diagram illustrating a structure of a battery assembly mounted on a device body according to some embodiments of the present disclosure.
Figure 5:
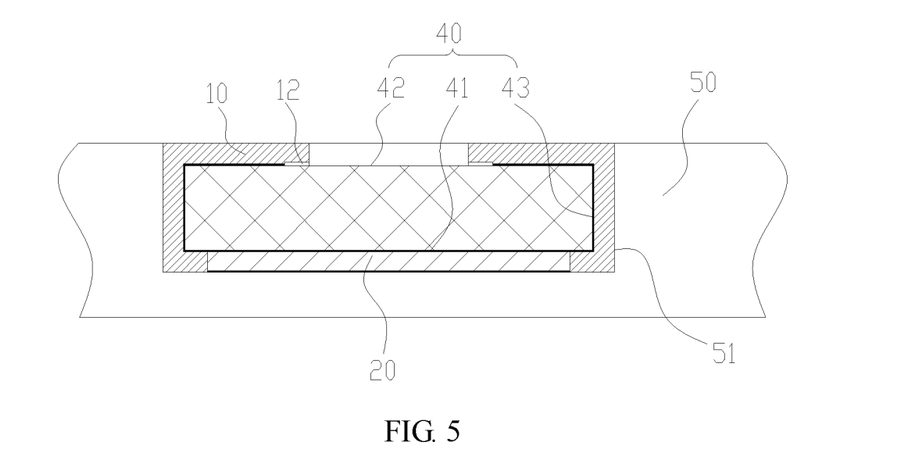
FIG. 5 is a schematic diagram illustrating a section taken along A-A line in FIG. 1.

As shown in FIGS. 1 and 5, an electronic device includes a device body 50 and a battery 40 detachably mounted in the device body 50. Where, the battery 40 includes a bottom surface 41, a top surface 42 arranged oppositely to the bottom surface 41, and a side surface 43 connecting the top surface 42 and the bottom surface 41. The device body 50 is provided with a battery cabin 51 for receiving the battery 40. The battery cabin 51 is formed with an inner wall and an opening by recessing from the surface of the device body 50. The battery 40 is put into the battery cabin 51 from the opening. The bottom surface 41 of the battery 40 is arranged to be opposite to a bottom wall of the battery cabin 51.

In some embodiments, an outer surface of the battery 40 is wrapped with an easy-to-remove member to form a battery assembly. The easy-to-remove member can have a laminated structure having multiple layers and/or regions, a single layer, a thin film, a membrane, etc., and can comprise a plastic material, a paper material, a resin material, etc. The easy-to-remove member is often referred to as a piece of "easy-to-remove paper," although it is not necessarily composed of paper. For example, the easy-to-remove member can be made of any suitable material, such as an insulating material. In some embodiments, the easy-to-remove member can also include one or more conductive portions such as one or more printed metal wires, to realize functions such as indication under electrical power when forming a closed circuit, etc.

When the battery assembly is mounted into the battery cabin 51, at least a part of the easy-to-remove paper is bonded with the inner wall of the battery cabin 51. The easy-to-remove paper is of a film-shaped structure and includes a first surface and a second surface. Where, the first surface is bonded with at least a part of the outer surface of the battery 40, and the second surface is opposite to the inner wall of the battery cabin 51 in a way that at least a part of the second surface is bonded with the inner wall of the battery cabin 51.

In some embodiments, the first surface of the easy-to-remove paper is attached to the bottom surface 41, the side surface 43 and the top surface 42 of the battery 40 in a bonding manner so that the easy-to-remove paper and the battery 40 form a battery assembly. At least a part of the inner wall of the battery cabin 51 of the device body or at least a part of the second surface of the easy-to-remove paper is coated with an adhesive, and then the battery assembly is mounted into the battery cabin 51. In this way, the battery assembly and the device body 50 constitute a complete structure as a main body 21 of the electronic device. In some embodiments, the easy-to-remove paper may be made of Polyethylene terephthalate (PET) and Polypropylene (PP) and so on.

Figure 2:
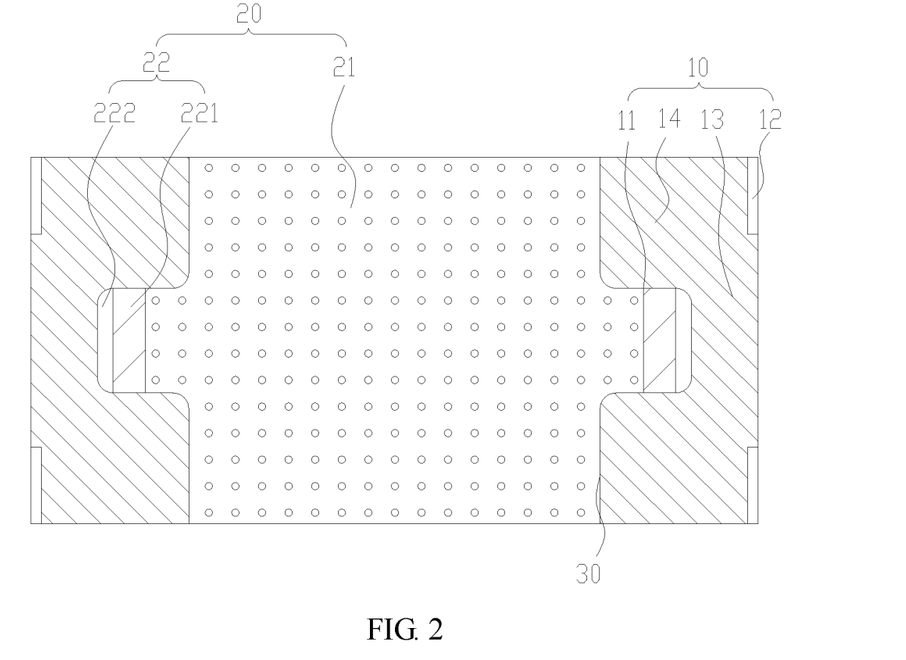
FIG. 2 is a schematic diagram illustrating a structure of a first surface of an easy-to-remove member in a spreading state according to some embodiments of the present disclosure.
Figure 3:
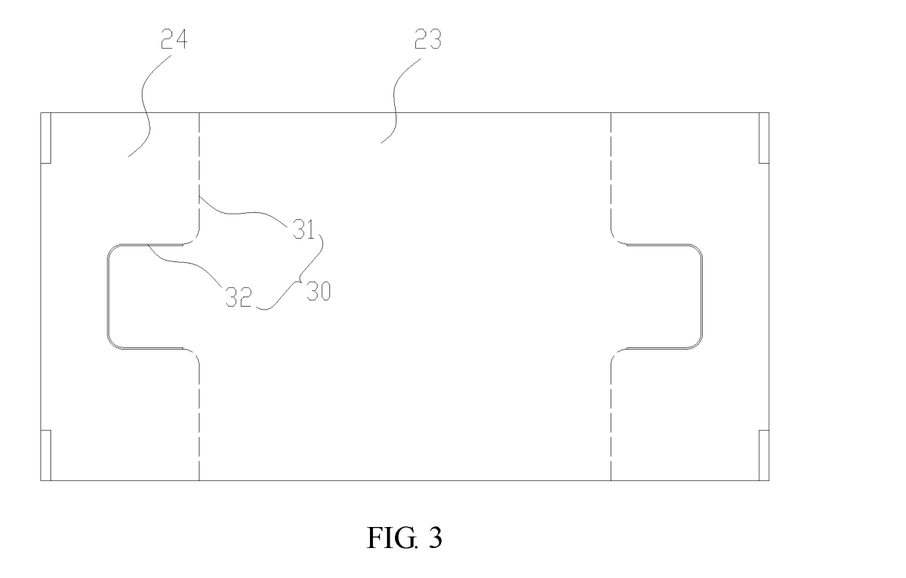
FIG. 3 is a schematic diagram illustrating a structure of an easy-to-remove member adopting an easy-to-tear fold according to some embodiments of the present disclosure.
Figure 4:
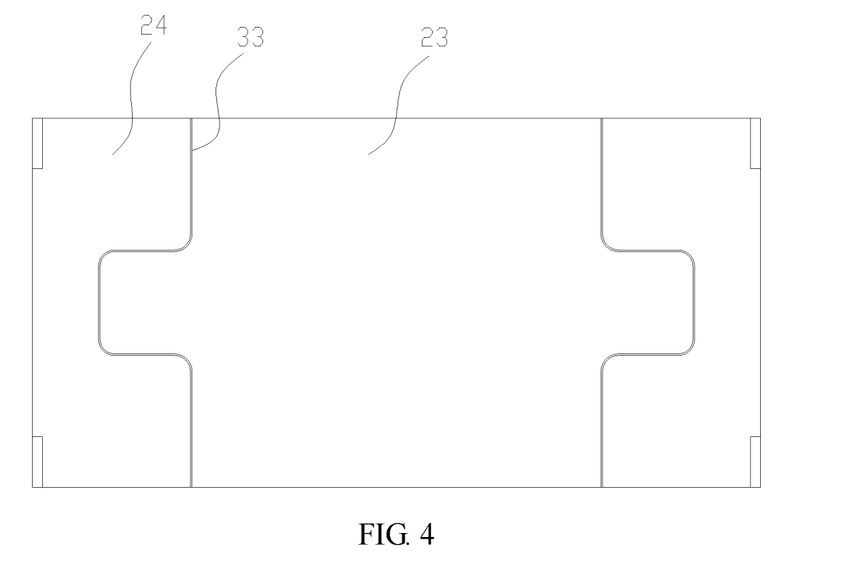
FIG. 4 is schematic diagram illustrating a structure of an easy-to-remove member being of split structure according to some embodiments of the present disclosure.

In some embodiments, as shown in FIGS. 2, 3 and 4, the first surface of the easy-to-remove paper includes a weak adhesive portion 20 and a strong adhesive portion 10. A separating structure is arranged at a boundary between the weak adhesive portion 20 and the strong adhesive portion 10. The separating structure is used for separating the easy-to-remove paper into a first body 23 and a second body 24. Where the first body 23 corresponds to the weak adhesive portion 20 and the second body 24 corresponds to the strong adhesive portion 10.

In some embodiments, as shown in FIG. 3, the first body 23 and the second body 24 of the easy-to-remove paper are formed as a one-piece structure. The separating structure includes an easy-to-tear fold 30 arranged at a boundary between the first body 23 and the second body 24. The easy-to-tear fold 30 may be provided with continuous holes/grooves distributed in a form of a dotted line (referred to as a dotted line portion) and a cutting seam 32 is provided at a position of a handle. The cutting seam 32 is in connection with the dotted line portion 31. When the handle is pulled by an external force, the easy-to-remove paper may be torn along the easy-to-tear fold 30 and separated into the first body 23 and the second body 24. As shown in FIG. 3, the dotted line portion 31 may extend to an edge of the easy-to-remove paper.

In some embodiments, as shown in FIG. 4, the first body 23 and the second body 24 of the easy-to-remove paper are formed as a split structure. The separating structure includes a separating groove 33 arranged at a boundary between the first body 23 and the second body 24. Correspondingly, the easy-to-remove paper is formed by a combination of the first body 23 and the second body 24. The weak adhesive portion 20 is located at a first surface of the first body 23 and the strong adhesive portion 10 is located at a first surface of the second body 24. The first body 23 and the second body 24 are respectively bonded with the battery 40 to form an easy-to-remove paper, and the separating groove 33 is arranged at the boundary between the first body 23 and the second body 24. In this case, during the process of disassembling the battery 40 bonded with the first surface of the easy-to-remove paper from the battery cabin 51, the easy-to-remove paper may be split into the first body 23 and the second body 24 along the separating groove 33.

When the battery 40 is placed on the first surface of the easy-to-remove paper, the easy-to-remove paper may bend along the surface of the battery 40 and wrap the battery 40. The weak adhesive portion 20 and the strong adhesive portion 10 are bonded with the outer surface of the battery 40, so that the easy-to-remove paper and the battery 40 are formed as a one-piece structure. In some embodiments, the weak adhesive portion 20 is attached to the bottom surface 41 of the battery 40. In other embodiments, at least a part of the weak adhesive portion 20 may also extend from the bottom surface 41 of the battery 40 to the top surface 42 of the battery 40. Correspondingly, in some embodiments, the strong adhesive portion 10 is attached to the top surface 42 of the battery 40. In other embodiments, at least a part of the strong adhesive portion 10 may also extend from the top surface 42 of the battery 40 to the bottom surface 41 of the battery 40.

When the battery 40 wrapped with the easy-to-remove paper is mounted into the battery cabin 51, the bottom surface 41 of the battery 40 exactly faces the bottom wall of the battery cabin 51 and the side surface 43 of the battery 40 exactly faces a side wall of the battery cabin 51. In this case, a second surface of the first body 23 of the easy-to-remove paper is bonded with the inner wall of the battery cabin 51, that is, the battery 40 is bonded with the battery cabin 51 through the first body 23 of the easy-to-remove paper.

Figure 6:
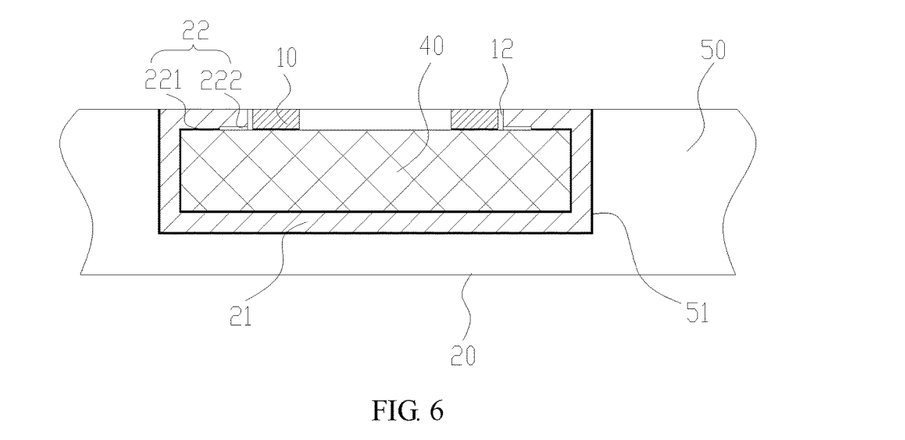
FIG. 6 is a schematic diagram illustrating a section taken along B-B line in FIG. 1.

As shown in FIGS. 5 and 6, a second surface of the second body 24 of the easy-to-remove paper is arranged to be opposite to the inner wall of the battery cabin 51 For example, the second surface of the second body 24 of the easy-to-remove paper and the inner wall of the battery cabin 51 may be mutually squeezed to be in contact or arranged with a gap without bonding. The first surface of the second body 24 of the easy-to-remove paper, that is, the strong adhesive portion 10, is bonded with the top surface 42 of the battery 40, and at least a part of the strong adhesive portion 10 may extend to the bottom surface 41. The side surface 43 located between the bottom surface 41 and the top surface 42 of the battery 40 may also be bonded with the strong adhesive portion 10. The second surface of the second body 24 of the easy-to-remove paper is not bonded with the device body 50. Thus, the second body 24 of the easy-to-remove paper is only bonded with the battery 40, and at least a part of the second body 24 of the easy-to-remove paper is located on the top surface 42 of the battery 40 for driving the battery 40 to be separated from the battery cabin 51.

When the easy-to-remove paper is bonded with the battery 40, a bonding strength between the strong adhesive portion 10 and the battery 40 is greater than a bonding strength between the weak adhesive portion 20 and the battery 40. At least a part of the second surface of the first body 23 of the easy-to-remove paper is coated with the adhesive or at least a part of the inner wall of the battery cabin 51 is coated with the adhesive. Further, a coating region of the adhesive is less than or equal to a contact surface between the first body 23 of the easy-to-remove paper and the battery cabin 51. Where, the bonding strength between the weak adhesive portion 20 and the battery 40 is less than a bonding strength between the second surface of the easy-to-remove paper and the battery cabin 51.

When it is desired to take the battery 40 out of the device body 50 for performing after-sales maintenance or replacing the battery 40 and the like, an operator may separate the easy-to-remove paper into the first body 23 and the second body 24 by using the separating structure located between the weak adhesive portion 20 and the strong adhesive portion 10. As shown in FIG. 6, a process of disassembling the battery 40 is detailed as follows:

The first body 23 of the easy-to-remove paper on the top surface 42 of the battery 40 is firstly pulled, so that the first body 23 of the easy-to-remove paper on the top surface 42 of the battery 40 is separated from the battery 40. Where, an edge of the first body 23 on the top surface 42 of the battery 40 is connected with the easy-to-tear fold 30.

The second body 24 of the easy-to-remove paper on the top surface 42 of the battery 40 is then pulled, so that the second body 24 of the easy-to-remove paper together with the battery 40 is torn along the easy-to-tear fold 30 and separated from the first body 23 of the easy-to-remove paper. Since the bonding strength between the weak adhesive portion 20 on the first surface of the easy-to-remove paper and the battery 40 is not only less than the bonding strength between the strong adhesive portion 10 and the battery 40, but also less than the bonding strength between the second surface of the easy-to-remove paper and the battery cabin 51, so that the first body 23 of the easy-to-remove paper may be still attached to the battery cabin 51 when the battery 40 is separated from the first body 23 of the easy-to-remove paper through the second body 24 of the easy-to-remove paper.

After the battery 40 and the second body 24 of the easy-to-remove paper are taken out from the battery cabin 51 of the device body 50, the operator may continue to disassemble the first body 23 of the easy-to-remove paper from the device body 50. In this way, the device body 50 may be cleaned easily. Further, after the second body 24 of the easy-to-remove paper and the battery 40 are separated from the device body 50, the operator may also continue to disassemble the second body 24 of the easy-to-remove paper from the battery 40.

The easy-to-remove paper is applied to an electronic device. The battery 40 is wrapped with the easy-to-remove paper and thus attached to the battery cabin 51, thereby facilitating installation. The first surface of the easy-to-remove paper that wraps the battery 40 is divided into the strong adhesive portion 10 and the weak adhesive portion 20 based on the distribution of adhesive. A separating structure may be arranged at the boundary between the strong adhesive portion 10 and the weak adhesive portion 20 to separate the easy-to-remove paper into the second body 24 and the first body 23. Where, the first body 23 corresponds to the weak adhesive portion 20 and the second body 24 corresponds to the strong adhesive portion 10. When the battery 40 is wrapped with the easy-to-remove paper and placed into the battery cabin 51 of the electronic device, the easy-to-remove paper is located between the battery cabin 51 and the battery 40 in a way that only the first body 23 corresponding to the weak adhesive portion 20 of the easy-to-remove paper is bonded with the battery cabin 51. When disassembling the battery 40 from the device body 50 of the electronic device, the second body 24 of the easy-to-remove paper attached to the battery 40 is separated from the first body 23 of the easy-to-remove paper and thus the battery 40 is also separated from the first body 23, so that the first body 23 of the easy-to-remove paper remains in the battery cabin 51 of the device body 50 as well as the battery 40 and the second body 24 of the easy-to-remove paper are separated from the battery cabin 51. Due to low bonding strength between the battery 40 and the weak adhesive portion 20, a force required for separating the battery 40 from the first body 23 of the easy-to-remove paper is relatively low and a deformation caused to the battery 40 is relatively small, thereby supporting repeated disassembly.

When the easy-to-remove paper is wrapped on the outer surface of the battery 40, the weak adhesive portion 20 is mainly distributed on the bottom surface 41 of the battery 40. The second surface of the first body 23 corresponding to the weak adhesive portion 20 is mutually bonded with the inner wall of the battery cabin 51. In some embodiments, at least a part of the weak adhesive portion 20 extends to the top surface 42 of the battery 40 and is bonded with the top surface 42, so that the first body 23 of the easy-to-remove paper is closely wrapped on the outer surface of the battery 40. Further, the strong adhesive portion 10 is bonded with the top surface 42 of the battery 40, and at least a part of the strong adhesive portion 10 may extend to the bottom surface 41 of the battery 40. As shown in FIGS. 5 and 6, the strong adhesive portion 10 and the weak adhesive portion 20 may be mutually penetrated.

In some embodiments, as shown in FIGS. 2, 5 and 6, the first body 23 of the easy-to-remove paper that corresponds to the weak adhesive portion 20 may include a main body 21 and at least one handle 22 formed by protruding outwardly from an edge of the main body 21. Further, the second body 24 of the easy-to-remove paper is provided with an avoiding notch 11 matched with the at least one handle 22. The first surface of the main body 21 is bonded with the bottom surface 41 of the battery 40. The handle 22 protrudes from the main body 21 and bends toward the top surface 42 of the battery 40. At least a part of the first surface of the handle 22 is attached to the side surface 43 of the battery 40 and bonded with the top surface 42 of the battery 40.

In some embodiments, the strong adhesive portions 10 include two parts located at two ends of the weak adhesive portion 20 respectively. Correspondingly, the easy-to-remove paper includes two second bodies 24 and one first body 23. When the battery 40 is placed on the first surface of the easy-to-remove paper, the easy-to-remove paper is wrapped on outer surface of the battery 40 in the form of ring and two end surfaces of the battery 40 are not wrapped with the easy-to-remove paper. In some embodiments, the first body 23 is provided with two handles 22 symmetrically arranged. Correspondingly, each second body 24 is provided with the avoiding notch 11 corresponding to the handle 22. The second body 24 is provided with the avoiding notch 11 to form a U-shaped structure and the strong adhesive portion 10 on two sides of the avoiding notch 11 is bonded with the bottom surface 41 of the battery 40. In this way, at least a part of the strong adhesive portion 10 is bonded with the bottom surface 41 of the battery 40 as shown in FIG. 5.

The handle 22 extends to the top surface 42 of the battery 40 and may be connected with the avoiding notch 11 through the easy-to-tear fold 30. Alternatively, a cutting seam 32 may be arranged between the handle 22 of the first body 23 and the second body 24 corresponding to the strong adhesive portion 10. The cutting seam 32 is good in separation guidance and thus the handle 22 is separated from the second body 24. Both ends of the cutting seam 32 are connected with the easy-to-tear fold 30. The strong adhesive portion 10 and the weak adhesive portion 20 extend along the cutting seam 32 to the easy-to-tear fold 30, so that the easy-to-remove paper is separated into the second body 24 and the first body 23.

The handle 22 is bent and attached to the top surface 42 of the battery 40. In some embodiments, the adhesive attached to the first surface of the handle 22 is same as the weak adhesive portion 20. In some embodiments, at least a part of the first surface of the handle 22 is coated with another adhesive or coated in a different manner, so that a strong adhesive zone 221 is formed on the handle 22. The strong adhesive zone 221 is bonded with the top surface 42 of the battery 40. The strong adhesive zone 221 may increase a bonding strength between the handle 22 and the top surface 42 of the battery 40, so that the first body 23 corresponding to the weak adhesive portion 20 of the easy-to-remove paper may be tightly attached to the surface of the battery 40 as well as the battery 40 is tightly locked in the battery cabin 51.

When the battery 40 is disassembled from the battery cabin 51, it is desired to firstly separated the handle 22 from the top surface 42 of the battery 40 to release the locking of the first body 23 of the easy-to-remove paper for the battery 40, thereby allowing the battery 40 to be separated from an opening of the battery cabin 51. The second body 24 of the easy-to-remove paper that is on the top surface 42 of the battery 40 is then pulled to separate the second body 24 of the easy-to-remove paper from the first body 23 along the easy-to-tear fold 30, and thus the battery 40 is separated from the battery cabin 51.

In some embodiments, as shown in FIGS. 2, 5 and 6, an edge of the handle 22 is provided with a first adhesive-free portion 222 that is not coated with adhesive. In a case that the handle 22 protrudes in the form of a long strip, the first adhesive-free portion 222 is arranged at an end of the handle 22 and adjacent to the strong adhesive zone 221. When it is desired to disassemble the handle 22 from the top surface 42 of the battery 40, an operator may pull the first adhesive-free portion 222 of the handle 22, so that the strong adhesive zone 221 of the handle 22 can be separated from the top surface 42 of the battery 40. That is, the first adhesive-free portion 222 may decrease the difficulty of separating the first body 23 including the handle 22 of the easy-to-remove paper from the top surface 42 of the battery 40.

The first body 23 of the easy-to-remove paper is bonded with the surface of the battery 40 through the weak adhesive portion 20 and is separated from the battery 40 when the battery 40 is departed from the battery cabin 51. Correspondingly, the bonding strength between the weak adhesive portion 20 on the first surface of the easy-to-remove paper and the battery 40 is less than the bonding strength between the second surface of the easy-to-remove paper and the battery cabin 51. In some embodiments, adhesive on the weak adhesive portion 20 is distributed with gaps. For example, the adhesive on the weak adhesive portion 20 may be of a strip shape, a dot shape or a grid shape. The spaced distribution of the adhesive may facilitate adjusting the bonding strength between the weak adhesive portion 10 and the battery 40. For example, if the adhesive is of the dot shape, the bonding strength between the weak adhesive portion 20 and the battery 40 may be adjusted by changing an amount of adhesives on unit area. Alternatively, the bonding strength between the weak adhesive portion 20 and the battery 40 may also be adjusted by changing the type of the adhesive.

In some embodiments, the strong adhesive portions 10 include two parts located at two ends of the weak adhesive portion 20 respectively. In some embodiments, the strong adhesive portion 10 and the weak adhesive portion 20 on the first surface of the easy-to-remove paper are symmetrically distributed. Correspondingly, the first body 23 and the second body 24 are also symmetrically distributed. The avoiding notch 11 is located at a middle position of the second body 24 corresponding to the strong adhesive portion 10, and the handle 22 of the first body 23 is matched with the avoiding notch 11 to form a complete plane. Each side of the strong adhesive portion 10 is of a U-shaped structure. The U-shaped structure includes two leg portions 14, a cross beam portion 13 connecting the two leg portions 14. At least a part of the leg portion 14 is bonded with the bottom surface 41 of the battery 40. The leg portion 14 may be bent to bond with the side surface 43 of the battery 40 and extend to the top surface 42. The cross-beam portion 13 is bonded with the top surface 42 of the battery 40. Two strong adhesive portions 10 are respectively attached to two opposite side surfaces of the battery 40. During a process of disassembling the battery 40 from the battery cabin 51 by pulling the battery 40, the cross-beam portion 13 is separated from the top surface 42 of the battery 40 to form a pulling structure. In this way, the two second bodies 24 corresponding to the strong adhesive portions 10 may be pulled at the same time, so that the first body 23 of the easy-to-remove paper can be separated from the second body 24. With a uniform force applied to the battery 40, the first body 23 of the easy-to-remove paper is completely separated from the second body 24 along the easy-to-tear fold 30.

In an embodiment, as shown in FIGS. 2, 5 and 6, the easy-to-remove paper may also include a second adhesive-free portion 12 that is not coated with adhesive. The second adhesive-free portion 12 is located at an edge of the strong adhesive portion 10. A preset region of the strong adhesive portion 10 is not coated with adhesive to form the second adhesive-free portion 12. In this way, when the strong adhesive portion 10 is bonded with the battery 40, the second adhesive-free portion 12 is separate from the battery 40. For example, the second adhesive-free portion 12 with a preset width may be arranged on an end of the strong adhesive portion 10. During a process of disassembling the battery 40 from the device body 50 by pulling the battery 40, an operator may apply a pulling force on the second adhesive-free portion 12. Further, since the bonding strength between the strong adhesive portion 10 and the top surface 42 of the battery 40 is stronger than that between the weak adhesive portion 20 and the bottom surface 41 of the battery 40, so that the battery 40 can be separated from the weak adhesive portion 20 through the strong adhesive portion 10. In addition, the operator may easily separate the strong adhesive portion 10 and the top surface 42 of the battery 40 by pulling the second adhesive-free portion 12.

In some embodiments, the easy-to-remove paper may be rectangular. The second adhesive-free portions 12 are located at four corners of the easy-to-remove paper and extend along an edge of the strong adhesive portions 10 to form strip-like regions. The second adhesive-free portion 12 is to facilitate pulling up the strong adhesive portion 10 attached to the top surface 42 of the battery 40, thereby improving disassembling efficiency of the battery 40.

In a case of no conflicts, the above embodiments and characteristics in the embodiments may be mutually combined.

Figure 7:
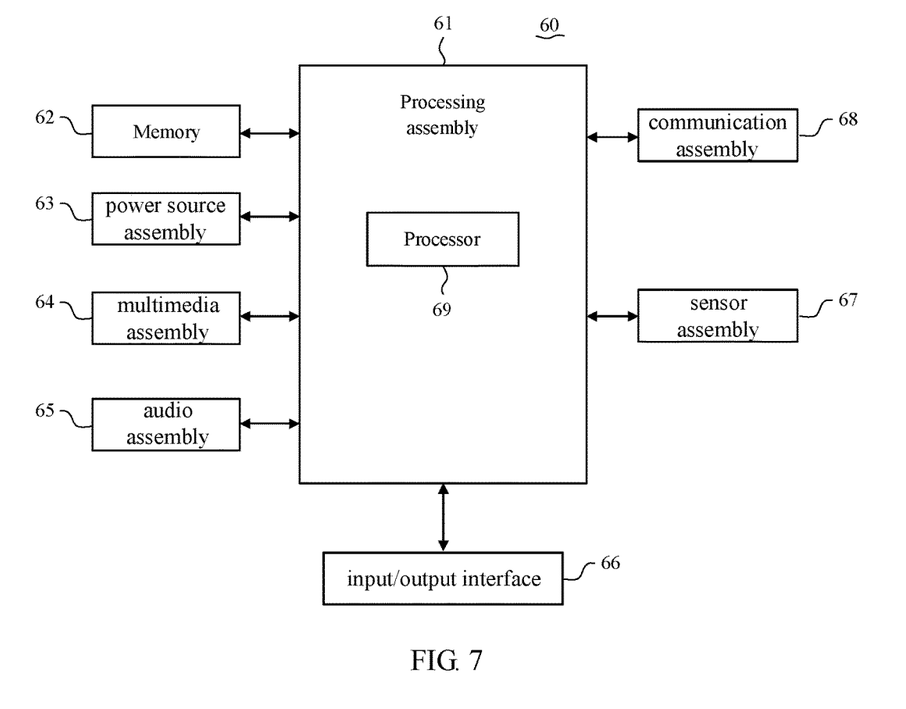
FIG. 7 is a block diagram illustrating an electronic device according to some embodiments of the present disclosure.

FIG. 7 is a block diagram illustrating an electronic device according to some embodiments of the present disclosure. The electronic device 60 includes a processor 69 and a memory 62 for storing instructions executable by the processor 69. The electronic device 60 may also include a battery assembly 63.

For example, the electronic device 60 may be a mobile phone, a computer, a digital broadcast terminal, a message transceiving device, a game console, a tablet device, a medical device, a fitness device and a personal digital assistant and so on.

As shown in FIG. 7, the electronic device 60 may include one or more assemblies of a processing assembly 61, a memory 62, a power source assembly 63, a multimedia assembly 64, an audio assembly 65, an Input/Output (I/O) interface 66, a sensor assembly 67 and a communication assembly 68.

The processing assembly 61 generally controls the overall operation of the electronic device 60, such as operations associated with displays, phone calls, data communications, camera operations, and recording operations. The processing assembly 61 may include one or more processors 69 to execute instructions to complete all or a part of the blocks of the above methods. In addition, the processing assembly 61 may include one or more modules to facilitate the interaction between the processing assembly 61 and other assemblies. For example, the processing assembly 61 may include a multimedia module to facilitate the interaction between the multimedia assembly 64 and the processing assembly 61.

The memory 62 is configured to store different types of data to support operation at the electronic device 60. Examples of such data include instructions, contact data, phonebook data, messages, pictures, videos, and so on for any application or method that operates on the electronic device 60. The memory 62 may be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power source assembly 63 provides power to different assemblies of the electronic device 60. The power source assembly 63 may include a power source management system, one or more power sources and other assemblies associated with generating, managing and distributing power for the electronic device 60.

The multimedia assembly 64 includes a screen providing an output interface between the electronic device 60 and a user. In some embodiments, the screen may include a Liquid Crystal Display (LCD), a light-emitting diode (LED) display such as an organic LED (OLED) display, and/or a Touch Panel (TP). If the screen includes a touch panel, the screen may be implemented as a touch screen to receive an input signal from a user. The touch panel includes one or more touch sensors to sense touch, slide and gestures on the touch panel. The touch sensor may not only sense the boundary of a touch or slide operation but also detect duration and pressure relating to the touch or slide operation. In some embodiments, the multimedia assembly 64 may include a front camera and/or a rear camera. When the electronic device 60 is in an operating mode, such as in a shooting mode or a video mode, the front camera and/or the rear camera may receive external multimedia data. Each of the front camera and the rear camera may be a fixed optical lens system or may be capable of focal length and optical zoom.

The audio assembly 65 is configured to output and/or input an audio signal. For example, the audio assembly 65 includes a microphone (MIC). When the electronic device 60 is in an operating mode, for example, in a call mode, a recording mode or a speech recognition mode, the microphone is configured to receive an external audio signal. The received audio signal may be further stored in the memory 62 or sent via the communication assembly 68. In some embodiments, the audio assembly 65 also includes a speaker for outputting an audio signal.

The I/O interface 66 provides an interface between the processing assembly 61 and a peripheral interface module. The peripheral interface module may be a keyboard, a click wheel, a button and the like. Such buttons may include but not limited to: a home button, a volume button, a start button and a lock button.

The sensor assembly 67 includes one or more sensors for evaluating states of the electronic device 60 in different aspects. For example, the sensor assembly 67 may detect the on/off state of the electronic device 60, and relative locations of assemblies, for example, the assembly is a display and a keypad of the electronic device 60. The sensor assembly 67 may also detect a position change of the electronic device 60 or one assembly of the electronic device 60, the presence or absence of contact of a user with the electronic device 60, an orientation or acceleration/deceleration of the electronic device 60 and a temperature change of the electronic device 60. The sensor assembly 67 may include a proximity sensor configured to detect presence of a nearby object without any physical contact. The sensor assembly 67 may also include an optical sensor, such as a CMOS or CCD image sensor for using in imaging application. In some embodiments, the sensor assembly 67 may also include an acceleration sensor, a gyroscope sensor, a magnetic sensor, a pressure sensor, or a temperature sensor.

The communication assembly 68 is configured to facilitate wired or wireless communication between the electronic device 60 and other devices. The electronic device 60 may access a wireless network based on a communication standard, such as WIFI, 2G or 3G, or a combination thereof. In some embodiments, the communication assembly 68 may receive a broadcast signal or broadcast-related information from an external broadcast management system via a broadcast channel. In some embodiments, the communication assembly 68 may also include a Near Field Communication (NFC) module to facilitate short-range communications. For example, the NFC module may be implemented based on Radio Frequency Identification (RFID) technology, Infrared Data Association (IrDA) technology, Ultra Wide Band (UWB) technology, Bluetooth (BT) technology and other technology.

In some illustrative embodiments, the electronic device 60 may be implemented by one or more of an application-specific integrated circuit (ASIC), a digital signal processor (DSP), a digital signal processing device (DSPD), programmable logical device (PLD), field programmable gate array (FPGA), a controller, microcontroller, a microprocessor or other electronic components to execute the above methods.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. An easy-to-remove member, applied to an electronic device,
wherein the electronic device comprises:
  a device body provided with a battery cabin for receiving a battery; and
  a battery having a bottom surface and an opposing top surface, and a side surface connecting the top surface and the bottom surface,
wherein the easy-to-remove member comprises:
  a first surface including:
    a weak adhesive portion to be bonded with the bottom surface of the battery; and
    a strong adhesive portion to be bonded with the top surface of the battery, wherein a separating structure is arranged at a boundary between the weak adhesive portion and the strong adhesive portion, the separating structure is to separate the easy-to-remove member into a first body and a second body, the first body corresponds to the weak adhesive portion, and the second body corresponds to the strong adhesive portion; and
  a second surface, wherein at least a part of the second surface of the first body is to be bonded with an inner wall of the battery cabin, and the second surface of the second body is to be attached to the inner wall of the battery cabin.

2. The easy-to-remove member according to claim 1, wherein,
  at least a part of the weak adhesive portion is also to be bonded with the top surface of the battery; and
  at least a part of the strong adhesive portion is also to be bonded with the bottom surface of the battery.

3. The easy-to-remove member according to claim 2, wherein when the battery is to be taken out from the battery cabin,
  by pulling the part of the weak adhesive portion that is on the top surface of the battery, a part of the first body is separated from the battery; and
  by pulling the part of the strong adhesive portion that is on the top surface of the battery, the second body together with the battery are separated from the first body while the first body is bonded with the battery cabin.

4. The easy-to-remove member according to claim 1, wherein,
  a bonding strength between the strong adhesive portion and the battery is greater than a bonding strength between the weak adhesive portion and the battery; and
  the bonding strength between the weak adhesive portion and the battery is less than a bonding strength between the second surface of the easy-to-remove member and the battery cabin.

5. The easy-to-remove member according to claim 2, wherein,
  the first body comprises:
    a main body; and
    at least one handle, wherein the at least one handle extends from the main body to the strong adhesive portion, and
    the second body is provided with an avoiding notch matched with the at least one handle.

6. The easy-to-remove member according to claim 5, wherein a cutting seam is arranged between the at least one handle and the strong adhesive portion.

7. The easy-to-remove member according to claim 5, wherein,
  at least a part of the handle is coated with adhesive to form a strong adhesive zone, and
  the strong adhesive zone is to be bonded with the top surface of the battery.

8. The easy-to-remove member according to claim 5, wherein an edge of the handle is provided with a first adhesive-free portion that is uncoated with adhesive.

9. The easy-to-remove member according to claim 1, wherein the adhesive of the weak adhesive portion is distributed with a spacing.

10. The easy-to-remove member according to claim 1, wherein the strong adhesive portion include two parts located at two ends of the weak adhesive portion respectively.

11. The easy-to-remove member according to claim 10, wherein
  the easy-to-remove member also comprises a second adhesive-free portion that is uncoated with adhesive and
  the second adhesive-free portion is located at an edge of the strong adhesive portion.

12. The easy-to-remove member according to claim 1, wherein,
  the first body and the second body are of a one-piece structure, and
  the separating structure includes an easy-to-tear fold arranged at a boundary between the first body and the second body.

13. The easy-to-remove member according to claim 1, wherein,
the first body and the second body are of a split structure, and
the separating structure includes a separating groove arranged at the boundary between the first body and the second body.

14. A battery assembly, comprising:
a battery for being received in a battery cabin; and
an easy-to-remove member, comprising:
a first surface, comprising:
a weak adhesive portion to be bonded with a bottom surface of the battery; and
a strong adhesive portion to be bonded with a top surface of the battery, wherein a separating structure is arranged at a boundary between the weak adhesive portion and the strong adhesive portion, the separating structure is to separate the easy-to-remove member into a first body and a second body, the first body corresponds to the weak adhesive portion and the second body corresponds to the strong adhesive portion; and
a second surface, wherein at least a part of the second surface of the first body is bonded with an inner wall of the battery cabin and the second surface of the second body is attached to the inner wall of the battery cabin.

15. The battery assembly according to claim 14, wherein,
at least a part of the weak adhesive portion is also to be bonded with the top surface of the battery; and
at least a part of the strong adhesive portion is also to be bonded with the bottom surface of the battery.

16. The battery assembly according to claim 14, wherein,
a bonding strength between the strong adhesive portion and the battery is greater than a bonding strength between the weak adhesive portion and the battery, and
the bonding strength between the weak adhesive portion and the battery is less than a bonding strength between the second surface of the easy-to-remove member and the battery cabin.

17. The battery assembly according to claim 14, wherein the strong adhesive portions include two parts located at two ends of the weak adhesive portion respectively.

18. An electronic device, comprising:
a processor;
memory for storing instructions executable by the processor;
a device body provided with a battery cabin; and
a battery assembly for being received in the battery cabin of the device body, comprising:
a battery; and
an easy-to-remove member, comprising:
a first surface, comprising:
a weak adhesive portion to be bonded with a bottom surface of the battery; and
a strong adhesive portion to be bonded with a top surface of the battery, wherein a separating structure is arranged at a boundary between the weak adhesive portion and the strong adhesive portion, the separating structure is to separate the easy-to-remove member into a first body and a second body, the first body corresponds to the weak adhesive portion and the second body corresponds to the strong adhesive portion; and
a second surface, wherein at least a part of the second surface of the first body is bonded with an inner wall of the battery cabin and the second surface of the second body is attached to the inner wall of the battery cabin.

19. The electronic device according to claim 18, wherein,
at least a part of the weak adhesive portion is also to be bonded with a top surface of the battery; and
at least a part of the strong adhesive portion is also to be bonded with a bottom surface of the battery.

20. The electronic device according to claim 18, wherein,
a bonding strength between the strong adhesive portion and the battery is greater than a bonding strength between the weak adhesive portion and the battery; and
the bonding strength between the weak adhesive portion and the battery is less than a bonding strength between the second surface of the easy-to-remove member and the battery cabin.

* * * * *